June 18, 1940.  H. H. BUGDEN  2,205,031

CONTINUOUSLY VARIABLE GEARING

Filed Jan. 13, 1939  2 Sheets-Sheet 1

Henry Hubbard Bugden
Inventor

By: Stevens & Davis
Attorneys

June 18, 1940.  H. H. BUGDEN  2,205,031
CONTINUOUSLY VARIABLE GEARING
Filed Jan. 13, 1939  2 Sheets-Sheet 2
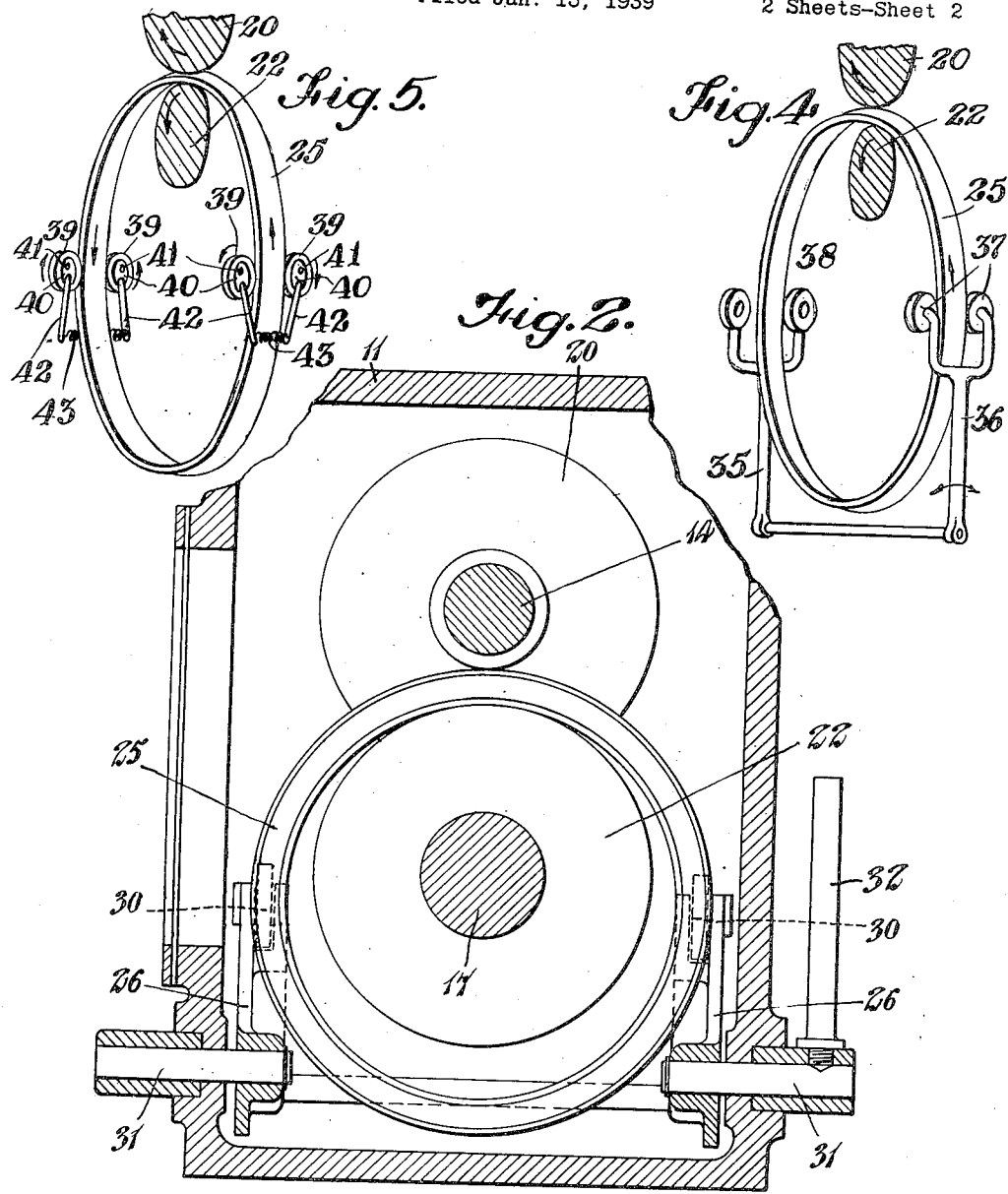
Henry Hubbard Bugden
INVENTOR
By Stevens & Davis
ATTORNEYS

Patented June 18, 1940

2,205,031

UNITED STATES PATENT OFFICE

2,205,031

CONTINUOUSLY VARIABLE GEARING

Henry Hubbard Bugden, London, England

Application January 13, 1939, Serial No. 250,817
In Great Britain January 17, 1938

16 Claims. (Cl. 74—192)

This invention relates to continuously variable gearing of that general type which consists of two frusto-cones disposed side by side and facing oppositely, together with a frictional element which, contacting both cones and being displaceable along them, transmits the torque from one cone to the other at a speed ratio determined by the radii of the cone surfaces where contacted by the frictional element in a one longitudinal position. Thus the frictional element may consist of a small wheel or roller of which the periphery engages the cone surfaces; or again, it may be a ring of such dissimilar materials as steel and rubber, which encircles one of the cones loosely and engages the surface of that cone with its inner periphery and the surface of the other cone with its outer.

With continuously variable torque transmission mechanism of this kind, when the frictional element is in the gap between the cones, it is necessary to maintain a thrust upon the cones in order that they may grip the frictional element without slip. This thrust is in practice applied axially of the cones, although the effective pressure is normal to the cone surfaces at the points where they contact the frictional element. The transmission of the force from the thrust creating means, such as a spring, through the cone to the frictional element may be compared to the action of a wedge; the actual force exerted on the ring being greater than the axial force applied to the cone.

In order that the device may function for any position of the friction element, the pressures between the cones and the friction element must be great enough to prevent slip; while in order that the utmost efficiency may be obtained from the mechanism it is desirable for these pressures to be little more than sufficient for the purpose.

As the diameter of the driving cone decreases continuously from one end thereof to the other, the pressure between this cone and the friction element, which is sufficient to prevent slip, will also vary continuously for different positions of the friction element, that is assuming the cone to be transmitting a torque of constant magnitude. Thus it will be seen that if a constant end thrust be applied to the cone and the effective or normal pressure acting on the friction element when at the narrow end of the driving cone is just sufficient to overcome slip, this pressure will be more than enough when the friction element is at the large end of said cone.

With a view to overcoming these necessary losses which would occur when the friction element was other than at the small end of the driving cone, it has been proposed to vary the amount of end thrust applied in accordance with the position of the friction element.

It is an advantage of the present invention that it provides an improved friction gearing of the nature set forth which shall not possess the drawback above referred to. The invention is not dependent, however, on the validity of the above theoretical considerations, for whether or not they are correct it remains that I have devised, as a manner of new manufacture, an improved continuously-variable gearing.

According to one feature of this invention, a continuously variable gearing of that general type first referred to above, has its cones of a curved formation; in other words, one has a bulged form, that is, its slanting edge is convex, while the other is hollowed or concave. The extent to which the shape departs from the straight line one known in the past and the actual nature of the curve, whether it is circular, parabolic, or the like, are questions to be determined in any particular case.

In accordance with another feature of the invention, a continuously variable gearing of that general type first referred to above, has its frictional element carried on an arm which is pivoted to a fixed part of the structure so that the frictional element has as its path a circular arc; the cones must be correspondingly shaped so that at all points in its path the frictional element may properly engage both of them.

Where the frictional element is in the form of a ring encircling one cone it can conveniently be displaced longitudinally of the cones by moving the ring at one side of the cones slightly in advance of the other side. In effect the ring is twisted about an axis which intersects the axes of the cones. The direction in which the ring is twisted will depend upon the direction of rotation of the cones.

The invention is illustrated by the accompanying drawings, of which:

Figures 1 and 2 show in sectional side elevation and in sectional end elevation respectively a continuously variable gear box in accordance with one form of the invention;

Figures 4 and 5 are diagrammatic perspective views showing alternate modifications of a detail of Figures 1 and 2.

Figure 1:
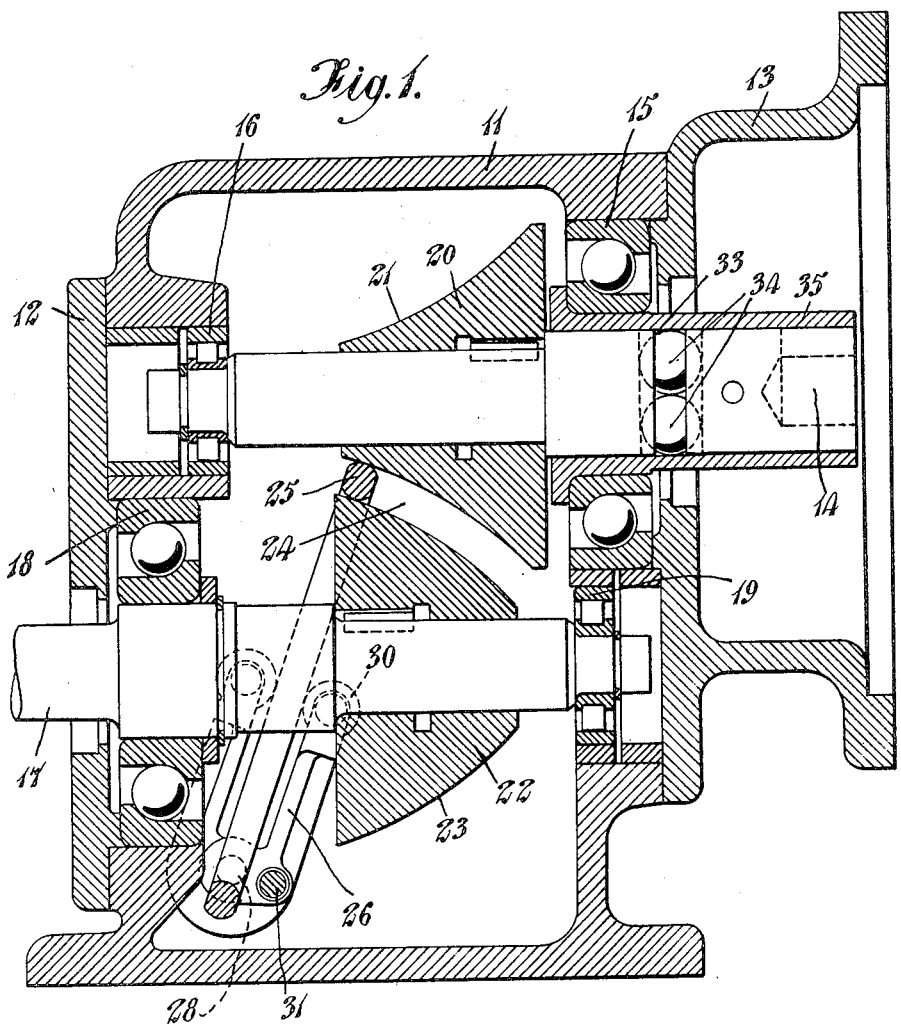
Figure 3:
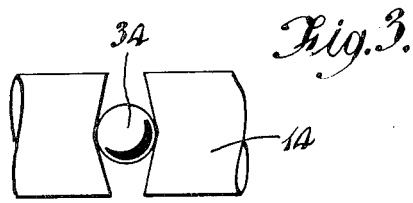
Figure 3 is a plan view of a detail.

Referring to Figures 1, 2 and 3, the invention is here shown in the form of a unit adapted to be permanently secured to an electric motor providing an output shaft the speed of which can be continuously varied within limits to suit requirements. The working parts are journalled in a casing 11 which has removable end covers 12 and 13. The input shaft 14 is journalled at opposite sides of the casing 11 in bearings 15 and 16 positioned in bosses on the casing 11, and the output shaft 17 is similarly journalled in bearings 18 and 19.

The input shaft 14 has keyed thereto the driving cone 20 which has its slanting surface 21 curved inwardly or concave, and the output shaft 17 has keyed thereto the driven cone 22, the slanting surface 23 of which is curved outwardly or convex. The cones are positioned side by side and face in opposite directions and are separated from one another as indicated at 24.

The bearings 15 and 18 adjacent the large diameter ends of the respective cones 20 and 22 are of the same overall diameter as said large ends, so that the cone 20 can be assembled on its shaft before being positioned within the casing 11. This also applies to the cone 22 and shaft 17; the two assembled shafts being positioned through opposite sides of the casing, after which the covers 12 and 13 are bolted in position.

The frictional element which contacts both the cones 20 and 22 to transmit the drive from the former to the latter comprises a ring 25 which encircles the cone 22. The cones and the ring may all be made from metal, but if desired the ring can be of any friction material, for example even of rubber. The ring 25 has its inner and outer peripheral surface curved transversely so that the ring makes only a small contact with the surfaces of the cones.

For displacing the ring longitudinally of the cones to effect a change of gear ratio forked members 26 and 27 are journalled at opposite sides respectively of the casing 11 in bearings 28 and 29 respectively. The bearings 28 and 29 are coaxial and are disposed at the centre of curvature of the gap between the two cones. Each forked member embraces part of the ring 25 and carries a pair of rollers 30, which co-operate with the ring 25 during swinging of the forked members about their pivotal mountings. One of the forked members carries rigidly a transverse rod 31 offset from the pivotal mounting and which extends across the casing and projects loosely into an aperture in the other forked member so as to transmit the rocking motion of the one to the other through a small amount of lost motion. The forked member 27 carrying rigidly the rod 31 will be rocked about its pivotal mounting by a control lever 32 disposed outside the casing. By this means movement of the control lever 32 will cause rocking of the forked members, the one moving in advance of the other so as to twist the ring 25 about an axis intersecting the axes of the two cones or shafts. As seen in Figure 2, the input cone 20 rotates in a clockwise direction, so that the friction ring and the other cone rotate anticlockwise, and the forked member at the right-hand side of the figure moves in either direction slightly in advance of the other forked member so as to twist the friction ring in the appropriate direction to facilitate the shifting of the ring longitudinally of the cones.

The input shaft 14 is interrupted at 33, where the opposing surfaces of the two sections of the shaft are V-shaped, as clearly seen in Figure 3. Balls 34 disposed between these opposing ends transmit the drive from the outer to the inner section. The outer section of the input shaft 14 is prevented from outward axial movement by means of the sleeve 35, to which it is pinned, and the bearing 15, which transmits the thrust on to the cover 13, which latter is a fixture. When the gear is transmitting a torque of a given magnitude the balls 34 tend to separate the two sections of the input shaft and thus apply an axial thrust to the cone 20, tending to move it closer to the cone 22 and thereby to create the requisite pressure on the friction ring 25. As the magnitude of the torque increases or decreases, so the pressure on the ring 25 will vary correspondingly.

For a given torque transmission the effective pressure on the ring 25 varies continuously from one end of the cone to the other owing to the shape of the cone surfaces, there being a greater wedging action when the ring is in the position shown in Figure 1 than when the ring is moved away from this position towards the other end of the cones.

If desired the friction ring can be twisted to facilitate its displacement along the cones by forming the two forked members or equivalent to move rigidly together as one and by arranging the rollers at the appropriate side so that they leave just sufficient space for the ring to pass between them, and allowing a clearance between the rollers and the ring at the other side. Such an arrangement is illustrated in Figure 4, where arrows indicate the direction of rotation of the cones 20 and 22 and the friction ring 25. The two forked members 35 and 36 move together as one and the rollers 37 carried by the member 36 just allow the ring 25 to pass between them whereas the rollers 38 carried by the member 35 are spaced so as to be separated from the side edges of the ring 25. Thus when the forked members 35 and 36 are rocked in either direction the ring 25 will be twisted accordingly before the corresponding one of the pair of rollers 38 contacts the ring. As in the construction previously described, this arrangement for twisting the ring will only function properly when the input shaft of the gear is rotated in the appropriate direction and will not function if the gear is rotated in the opposite direction.

There is illustrated in Figure 5 modified means for controlling the actuation of the friction element whereby said friction element will be automatically twisted in the appropriate direction whether the input of the gear is rotated clockwise or anti-clockwise. In this form the rollers are comprised by annuli 39 rotatable around discs 40 eccentrically mounted at 41. The pivots 41 of the discs 40 are disposed just above the centers of the rollers as shown. The pivots 41 of each pair are separated so as to prevent complete rotation of the discs 40 due to the interposition of the ring 25. Also the discs of each pair carry rigidly projecting arms 42 which are urged together at their free ends by tension springs 43 connecting the arms of each pair. When the ring 25 is rotating in the direction indicated by the arrows, the pair of rollers at the right-hand side of the figure tend to grip the ring due to a wedging action. The other pair of rollers tend to move in the directions indicated to widen their distance of separation. When the ring 25 is rotated in the opposite direction the opposite occurs. Thus the ring 25 will be twisted in the appropriate direction for a given direction of rotation of the ring.

A continuously variable frictional gearing in accordance with the invention, may have many uses; for example, such a gearing may form part of a hand drill which is thus provided with means whereby the speed of rotation of the chuck can be varied in accordance with the size of the drill used. Such frictional gearing can be used in practically all cases where it is desired to vary the ratio between a driving and a driven member.

What I claim is:

1. A continuously-variable torque-transmission gearing comprising in combination a first frusto-cone of concave surface, a second frusto-cone of convex surface arranged side by side with the first but facing oppositely, and a frictional element contacting both cones and displaceable along them to vary the torque-transmission ratio, and a frame maintaining said cones in frictional contact with and exerting pressure upon said frictional element.

2. A continuously-variable torque-transmission gearing comprising in combination a driving element in the form of a concave-surfaced cone, a driven element in the form of a convex-surfaced cone arranged alongside the driving element but facing oppositely, a frictional element contacting both cones and displaceable along them to vary the torque-transmission ratio, and a frame maintaining said cones in frictional contact with and exerting pressure upon said frictional element.

3. A continuously-variable torque-transmission gearing comprising in combination a driving element in the form of a concave-surfaced cone, a driven element in the form of a convex-surfaced cone arranged alongside the driving element but facing oppositely, a frictional element, contacting both cones at proximate points adjacent the plane of cone-axes, and displaceable along the cones to vary the torque-transmission ratio, and a frame maintaining said cones in frictional contact with and exerting pressure upon said frictional element.

4. A continuously-variable torque-transmission gearing comprising in combination a first frusto-cone of concave surface, a second frusto-cone of convex surface arranged side by side with the first but facing oppositely, a ring encircling one cone and contacting both of them, displaceable along the cones to vary the torque-transmission ratio, and a frame maintaining said cones in frictional contact with and exerting pressure upon said ring.

5. A continuously variable torque-transmission gearing comprising in combination a driving element in the form of a concave-surfaced cone, a driven element in the form of a convex-surfaced cone arranged alongside the driving element but facing oppositely, a frictional torque-transmitting ring encircling one cone, means for imparting to the ring a slight lateral twist so that as it rotates it also creeps along the cones, and a frame maintaining said cones in frictional contact with and exerting pressure upon said ring.

6. A continuously-variable torque-transmission gearing comprising in combination a driving element in the form of a concave-surfaced cone, a driven element in the form of a convex-surfaced cone arranged alongside the driving element but facing oppositely, a ring encircling one cone and contacting both of them, displaceable along the cones to vary the torque-transmission ratio, and a frame maintaining said cones in frictional contact with and exerting pressure upon said ring.

7. A continuously variable torque-transmission gearing comprising in combination a frame, a driving element in the form of a concave-surfaced cone mounted for rotation about the axis thereof in said frame, a driven element in the form of a convex-surfaced cone mounted for rotation about the axis thereof in said frame, the axes of said driving element and said driven element being substantially parallel and the adjacent lines of intersection of the surfaces thereof with the plane of the axes of said elements being substantially concentric, a ring encircling one of said elements and contacting both of them, displaceable along the elements to vary the torque-transmission ratio, an arm pivoted to the frame on each side of said plane of axes substantially at the center of curvature of said concentric lines of intersection with said plane, a pair of rollers on each of said arms adapted to contact opposite sides of the ring to guide said ring and means to simultaneously move said arms about the points of pivotal attachment thereof.

8. A continuously variable torque-transmission gearing comprising in combination a frame, a driving element in the form of a concave-surfaced cone mounted for rotation about the axis thereof in said frame, a driven element in the form of a convex-surfaced cone mounted for rotation about the axis thereof in said frame, the axes of said driving element and said driven element being substantially parallel and the adjacent lines of intersection of the surfaces thereof with the plane of the axes of said elements being substantially concentric, a ring encircling one of said elements and contacting both of them, displaceable along the elements to vary torque-transmission ratio, an arm pivoted to the frame on each side of said plane of axes substantially at the center of curvature of said concentric lines of intersection with said frame, a pair of rollers on each of said arms contacting opposite sides of the ring to guide said ring and means to simultaneously move said arms about the points of pivotal attachment thereof, the rollers on one of said arms being adapted to make immediate operative contact with said ring upon movement of said arm and the rollers on the other of said arms being adapted to make operative contact with said ring only after substantial movement of said last named arm.

9. A continuously variable torque-transmission gearing comprising in combination a frame, a driving element in the form of a concave-surfaced cone mounted for rotation about the axis thereof in said frame, a driven element in the form of a convex-surfaced cone mounted for rotation about the axis thereof in said frame, the axes of said driving element and said driven element being substantially parallel and the adjacent lines of intersection of the surface thereof with the plane of the axes of said elements being substantially concentric, a ring encircling one of said elements and contacting both of them, displaceable along the elements to vary the torque-transmission ratio, an arm pivoted to the frames on each side of said plane of axes substantially at the center of curvature of said concentric lines of intersection with said plane, a pair of rollers on each of said arms contacting opposite sides of the ring to guide said ring and means to simultaneously move said arms about the points of pivotal attachment thereof, the rollers on one of said arms being adapted to make immediate operative contact with said ring upon movement of said arm and the rollers on the other of said arms being adapted to make operative contact with said ring only after substantial movement of said last named arm.

10. A continuously-variable torque-transmission gearing comprising in combination a frame, a driving element in the form of a concave-surfaced cone mounted for rotation about the axis thereof in said frame, a driven element in the form of a convex-surfaced cone mounted for rotation about the axis thereof in said frame arranged alongside the driving element but facing oppositely, a frictional element contacting both cones and displaceable along them to vary the torque-transmission ratio in a path which is a circular arc within the plane of cone axes, and an arm displacing the frictional element pivotally connected to said frame at a point in the vicinity of the centre of the circular arc.

11. A continuously-variable torque-transmission gearing comprising in combination a frame, a pair of cones arranged in said frame for rotation about the axes thereof side by side but facing oppositely, a frictional element engaging both cones, and an arm pivotally connected to said frame and carrying with it the frictional element to vary the speed-ratio, the cone surfaces being curved, one convex and the other concave so that the path of the element, lying in the plane of cone axes, is a circular arc concentric with the arm pivot.

12. A continuously-variable torque-transmission gearing comprising in combination a frame, a first frusto-cone of concave surface mounted for rotation about the axis thereof in said frame, a second frusto-cone of convex surface arranged for rotation about the axis thereof in said frame side by side with the first but facing oppositely, a ring encircling one cone and contacting both of them, displaceable along the cones to vary the torque-transmission ratio, a pair of arms pivoted to said frame, a pair of rollers carried on one of said arms and guiding the ring on one side of the plane of cone axes, and a pair of rollers carried on the arm on the other side of the plane of cone axes and there guiding the ring, each roller being comprised by an annulus revolvable on an eccentrically mounted disc, the discs on each of said arms being connected by resilient means tending to cause the centers of the two discs to move toward each other so that movement of the arm in either direction will impart a slight lateral twist to the ring in the appropriate direction irespective of whether the input of the gear is rotating clockwise or anti-clockwise, the said arms being connected together by means for causing substantially simultaneous movement thereof.

13. A continuously-variable torque-transmission gearing comprising in combination a frame, a driving element in the form of a concave-surfaced cone mounted for rotation about the axis thereof in said frame, a driven element in the form of a convex-surfaced cone arranged for rotation about the axis thereof in said frame alongside the driving element but facing oppositely, a ring encircling one cone and contacting both of them, displaceable along the cones to vary the torque-transmission ratio, a pair of arms pivoted to said frame, a pair of rollers carried on one of said arms and guiding the ring on one side of the plane of cone axes, and a pair of rollers carried on the arm on the other side of the plane of cone axes and there guiding the ring, each roller being comprised by an annulus revolvable on an eccentrically mounted disc, the discs on each of said arms being connected by resilient means tending to cause the centers of the discs to move toward each other so that movement of the arm in either direction will impart a slight lateral twist to the ring in the appropriate direction irrespective of whether the input of the gear is rotating clockwise or anti-clockwise, said arms being connected by means for causing simultaneous movement thereof.

14. A continuously-variable torque-transmission gearing comprising in combination a frame, a driving element in the form of a concave-surfaced cone mounted for rotation about the axis thereof in said frame, a driven element in the form of a convex-surfaced cone arranged for rotation about the axis thereof in said frame alongside the driving element but facing oppositely, a ring encircling one cone and contacting both of them, displaceable along the cones to vary the torque-transmission ratio, a pair of rigid arms pivoted to said frame, a pair of rollers carried on one of said arms and guiding the ring on one side of the plane of cone axes, and a pair of rollers carried on the arm on the other side of the plane of cone axes and there guiding the ring, the rollers of one pair being more widely separated than the rollers of the other pair, so that movement of the arm will effect a slight lateral twisting of the ring, which latter will creep along the cones when rotating, said arms being connected by means for causing simultaneous movement thereof.

15. A continuously-variable torque-transmission gearing comprising in combination a frame, a driving element in the form of a concave-surfaced cone mounted for rotation about the axis thereof in said frame, a driven element in the form of a convex-surfaced cone arranged for rotation about the axis thereof in said frame alongside the driving element but facing oppositely, a frictional element in the form of a ring encircling one cone and contacting both of them, displaceable along the cones in a path which is a circular arc within the plane of cone axes, a pair of arms pivoted to said frame, a pair of rollers carried on one of said arms and guiding the ring on one side of the plane of cone axes, and a pair of rollers carried on the arm on the other side of the plane of cone axes and there guiding the ring, each roller being comprised by an annulus revolvable on an eccentrically mounted disc, the discs on each of said arms being connected by resilient means tending to cause the centers of the two discs to move toward each other so that movement of the arm in either direction will impart a slight lateral twist to the ring in the appropriate direction irrespective of whether the input of the gear is rotating clockwise or anti-clockwise, said arms being connected by means for causing simultaneous movement thereof.

16. A continuously-variable torque-transmission gearing comprising in combination a frame, a driving element in the form of a concave-surfaced cone mounted for rotation about the axis thereof in said frame, a driven element in the form of a convex-surfaced cone arranged for rotation about the axis thereof in said frame alongside the driving element but facing oppositely, a pair of rigid arms pivoted to said frame, a pair of rollers caried on one of said arms and guiding the ring on one side of the plane of cone axes, and a pair of rollers carried on the arm on the other side of the plane of cone axes and there guiding the ring, the rollers of one pair being more widely separated than the rollers of the other pair, so that movement of said arms will effect a slight lateral twisting of the ring, which latter will creep along the cones when rotating, said arms being connected by means for causing simultaneous movement thereof.

HENRY HUBBARD BUGDEN.